US009422699B2

(12) United States Patent
Li et al.

(10) Patent No.: US 9,422,699 B2
(45) Date of Patent: Aug. 23, 2016

(54) TOILET INLET VALVE AND CONTROL METHOD THEREOF

(75) Inventors: Feiyu Li, Xiamen (CN); Dongsheng Yao, Xiamen (CN); Yuzhi Liu, Xiamen (CN)

(73) Assignee: WDI (XIAMEN) TECHNOLOGY INC., Xiamen (CN)

( * ) Notice: Subject to any disclaimer, the term of this patent is extended or adjusted under 35 U.S.C. 154(b) by 372 days.

(21) Appl. No.: 13/884,847

(22) PCT Filed: Nov. 7, 2011

(86) PCT No.: PCT/CN2011/081849
§ 371 (c)(1), (2), (4) Date: May 10, 2013

(87) PCT Pub. No.: WO2012/062189
PCT Pub. Date: May 18, 2012

(65) Prior Publication Data

US 2013/0228238 A1 Sep. 5, 2013

(30) Foreign Application Priority Data

Nov. 11, 2010 (CN) .......................... 2010 1 0541742

(51) Int. Cl.

| | |
|---|---|
| ***F16K 31/18*** | (2006.01) |
| ***E03D 1/32*** | (2006.01) |
| ***F16K 21/18*** | (2006.01) |
| ***F16K 31/22*** | (2006.01) |
| ***F16K 31/34*** | (2006.01) |

(52) U.S. Cl.
CPC ................. *E03D 1/32* (2013.01); *F16K 21/18* (2013.01); *F16K 31/22* (2013.01); *F16K 31/34* (2013.01); *Y10T 137/0318* (2015.04); *Y10T 137/7442* (2015.04)

(58) Field of Classification Search
CPC ...... F16K 31/34; F16K 21/18; F16K 31/385; F16K 31/26; E03D 1/32; E03D 9/14; E03D 11/00
USPC ................ 137/413, 414, 437, 441–444, 451, 137/484.8, 485–492.5; 251/25–47
See application file for complete search history.

(56) References Cited

U.S. PATENT DOCUMENTS 2,986,155 A * 5/1961 Doyle ........................... 137/218
4,180,096 A * 12/1979 Johnson ........................ 137/403

(Continued)

FOREIGN PATENT DOCUMENTS

| | | |
|---|---|---|
| CN | 2421475 Y | 2/2001 |
| CN | 2694075 Y | 4/2005 |
| CN | 2755374 Y | 2/2006 |

(Continued)

*Primary Examiner* — Kevin Murphy
*Assistant Examiner* — Hailey K Do
(74) *Attorney, Agent, or Firm* — Rabin & Berdo, P.C.

(57) ABSTRACT

A toilet inlet valve and control method thereof, the inlet valve comprises a valve body, an inlet pipe, a water stop device with a water stop rubber gasket, a float bowl device, a raising rod device and an outlet pipe, wherein, the water stop device also comprises a water stop seat, a tray, a needle valve and a back pressure cavity; the water stop seat is located at the front end of the outlet pipe, and of which the opening is coupling with the end face of the water stop rubber gasket; the tray is connected to the water stop rubber gasket, and is located at the side of the water stop seat that is opposite to the water stop rubber gasket; the needle valve is fixed to the tray, and is located at the side of the water stop rubber gasket that is opposite to the tray.

11 Claims, 9 Drawing Sheets

12 121 11 14 1 52 2 3 5 4 6 9 10 16 101 8 7 15 13

(56) References Cited

U.S. PATENT DOCUMENTS

| | | | | |
|---|---|---|---|---|
| 5,623,961 | A * | 4/1997 | Nichols-Roy | 137/377 |
| 6,244,292 | B1 | 6/2001 | Antunez | |
| 2006/0124878 | A1 * | 6/2006 | Jobe et al. | 251/11 |

FOREIGN PATENT DOCUMENTS

| | | | |
|---|---|---|---|
| CN | 2931970 | Y | 8/2007 |
| CN | 2937690 | Y | 8/2007 |
| RU | 2181454 | C1 | 4/2002 |

* cited by examiner

TOILET INLET VALVE AND CONTROL METHOD THEREOF

FIELD OF THE INVENTION

The present invention relates to a flow valve, more particular to a liquid level control valve for the water tank of toilet and corresponding control method

BACKGROUND OF THE INVENTION

Level control valve with float bowl has been widely used in the inlet control device of the flush toilet. This kind of valves uses the buoyant force of the float bowl to control the inlet according to the water level in the water tank, and supply water to the water tank automatically. Wherein, the on and off of the valve are controlled by the raising rod device, so that the vertical displacement can control the mechanisms, such as the needle valve, the tray, the water stop rubber gasket and so on.

Because this kind of valves are directly connected to the urban domestic water pipe, the inlet pressure and stability are affected by the whole water supply net, water flow may impact the valve when the water pressure is too high or not stable enough, water flow may impact the valve, because the level control valve uses a plurality of linked mechanical structural members including the needle valve, this impact may affect the longevity of these structural members at different levels, and generates a lot of noise inevitably, affecting the home or public environment. The applicant has gotten an authorized proposal of needle valve CN2421475Y, which relates to an inlet valve with needle valve, because the needle valve is sleeved to the water stop rubber gasket in a moving manner, and the water stop rubber gasket uses soft material, the gap of the needle valve is unstable during the moving process controlled by water pressure, and then noise and shake can be brought during the water stop process, therefore, how to design a reliable, quite and more human valve is to be a unsolved technical matter.

SUMMARY OF THE INVENTION

The present invention discloses a toilet inlet valve aiming at the said lifetime of valve and noise problem, and the technical proposal is:

A toilet inlet valve, comprises a valve body, an inlet pipe, a water stop device with a water stop rubber gasket, a float bowl device, a raising rod device and an outlet pipe, the water stop device also comprises:

A water stop seat, which is located at the front end of the outlet pipe, and of which the opening is coupling with the end face of the water stop rubber gasket;

A tray, which is connected to the water stop rubber gasket, and is located at the side of the water stop seat that is opposite to the water stop rubber gasket;

A needle valve, which is fixed to the tray, and is located at the side of the water stop rubber gasket that is opposite to the tray;

A back pressure cavity, which is a cavity with a discharge hole, containing the tray and the needle valve, and is provided with a needle valve hole sleeving to the needle valve;

As another kind of similar proposal, it can done in the following way:

A toilet inlet valve, comprises a valve body, an inlet pipe, a water stop device with a water stop rubber gasket, a float bowl device, a raising rod device and an outlet pipe, the water stop device also comprises:

A water stop seat, which is located at the end of the inlet pipe, and of which the opening is coupling with the end face of the water stop rubber gasket;

A tray, which is connected to the water stop rubber gasket, and is located at the side of the water stop seat that is opposite to the water stop rubber gasket;

A needle valve, which is fixed to the tray, and is located at the side of the water stop rubber gasket that is opposite to the tray;

A back pressure cavity, which is a cavity with a discharge hole, containing the tray and the needle valve, and is provided with a needle valve hole sleeving to the needle valve;

As the preferred embodiment of the present proposal, several improvements can be done in the following way:

In the two same kinds of proposals above, the needle valve is divided into two segments along its axial direction, which are:

A coupling segment, of which the cross section is coupling with the needle valve hole; and a gap segment, of which the cross section is not coupling with the needle valve hole but provided with clear gap. According to the two-segment-type of the needle valve, one realization form is: the cross section of the coupling segment of the needle valve is circular, and the outer surface of the gap segment is provided with a plurality of slots along the axial direction of the needle valve, which extend to the tray. Another realization form is: the cross section of the coupling segment of the needle valve is circular, and that of the gap segment is also circular, and the diameter of the cross section of the gap segment is shorter than the diameter of the cross section of the coupling segment.

A filter with a filter screen is provided at the entrance of the inlet water out of the needle valve hole. And the inlet of the filter screen of the filter is designed to be vertically ahead the vector direction of water flow from the inlet pipe.

In the first proposal, a coaxial air bag cavity is provided out of the inlet pipe, and the bottom of the air bag cavity comprises a circular elastic air bag.

In the first proposal, the fluid cavity on the bottom of the inlet pipe is provided with a rotary structure.

In the two proposals above, the shape of the tray is bowl-shaped, of which the outer surface is a cylindrical surface.

According to the two-segment-type structure of the needle valve, the control method in the present invention comprises a steady state and two dynamic states:

The steady state: the discharge opening is blocked, the back pressure cavity is only provided with one inlet, namely the gap between the needle valve and the needle valve hole; the back pressure cavity is filled with water, the intensity of pressure of the water pressure to the water stop rubber gasket in the back pressure cavity is equal to the outside intensity of pressure, and the water stop rubber gasket keeps still and blocks the water stop seat, and the tray and the needle valve keep still relatively, and the coupling segment of the needle valve is in the needle valve hole;

The first dynamic state: on the basis of the steady state, the discharge opening is opened, the stored water in the back pressure cavity quickly flows out of the discharge opening, and in which the intensity of pressure decreased quickly; and the intensity of pressure of water pressure to the water stop rubber gasket in the back pressure cavity is clearly smaller than the outside intensity of pressure, the water stop rubber gasket is obligated by the outside water pressure to retract ahead the back pressure cavity along with the tray and the needle valve, and the coupling segment of the needle valve is located in the needle valve hole first and then the gap segment along with the increasing of the retracting process; this first dynamic state can be summed up to be the opening process of the water stop rubber gasket.

The second dynamic state: on the basis of the second dynamic state, the discharge opening is blocked, because water in the inlet pipe flows into the back pressure cavity through the gap between the needle valve hole and the needle valve, water in the back pressure cavity starts to increase; along with the water increasing process, the pressure in the back pressure cavity increases, the water stop rubber gasket is pushed to extend outward the back pressure cavity by the tray, and the needle valve is driven to move opposite to the first dynamic state in the needle valve hole, and then the gap segment of the needle valve is located in the needle valve hole first then the coupling segment, so that the inlet rate in the back pressure cavity is reduced, and then the pressure increasing rate in the back pressure cavity is reduced, and then the rate that the water stop rubber gasket is opposed by the tray to block the water stop sea is remitted; this second dynamic state can be summed up to be the damping closing process of the water stop rubber gasket that lasts until the steady state is present.

The benefits of the present invention are:

1 the tray and the needle valve is linked in a fixing manner, the gap between the needle valve and the needle valve hole is the inlet of the back pressure cavity that is at the opposite side of the water stop rubber gasket and the tray and sleeved in the hard needle valve hole in a moving manner, the inlet of the back pressure cavity is far from the water stop component of the valve, and the gap between the needle valve and the needle valve hole is stable, so that the noise and the shake are deceased during working.

2 because the two-segment-type structure, the needle valve is provided with a damping closing process during the working cycle, so that the impact and the shake caused by water stop are greatly relieved, and then the gouging abrasion and working noise of the components are decreased.

3 water enters the needle valve device is buffered and filtered because of the filter screen of the filter and the transverse inlet structure of the filter screen; the water pressure is relieved on one hand, and on the other hand all kinds of solid impurity in water flow because of the impact is filtered vertically and flushed, so that the working of the needle valve is more stable and safter.

4 the coaxial air bag cavity that is out of the inlet pipe offers diffluent and decompressive effect to the fluid when water flows into the whole valve.

5 the fluid cavity at the bottom of the inlet pipe is provided with rotary structure to restrict the vector precession of water flow, most of the impact energy in water flow is appropriately resolved and absorbed by the vector precession water way, and the shake and the noise caused by the impact is greatly avoided.

BRIEF DESCRIPTION OF THE DRAWINGS

With the following description of the drawings and specific embodiments, the invention shall be further described in details.

DESCRIPTION OF THE PREFERRED EMBODIMENTS

Embodiment 1

Figure 1:
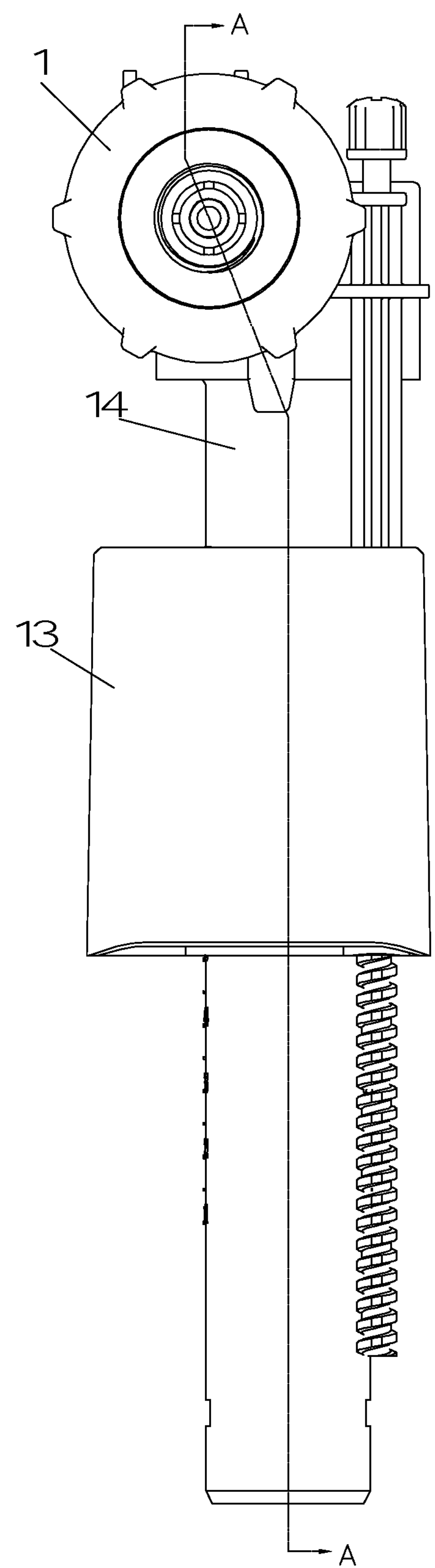
FIG. 1 shows the left view of the preferred embodiment 1 in the present invention.
Figure 2:
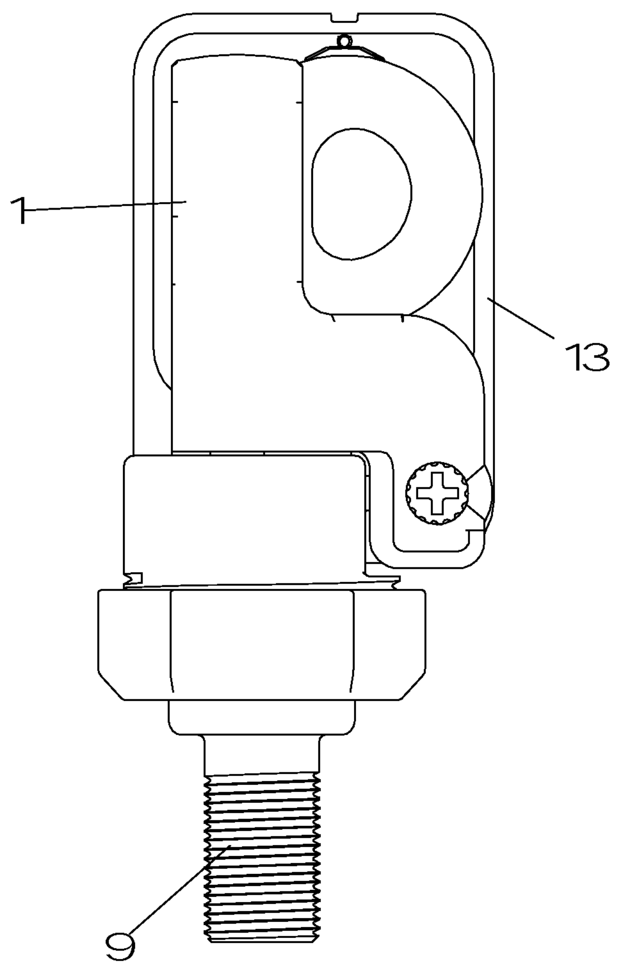
FIG. 2 shows the top view of FIG. 1.
Figure 3:
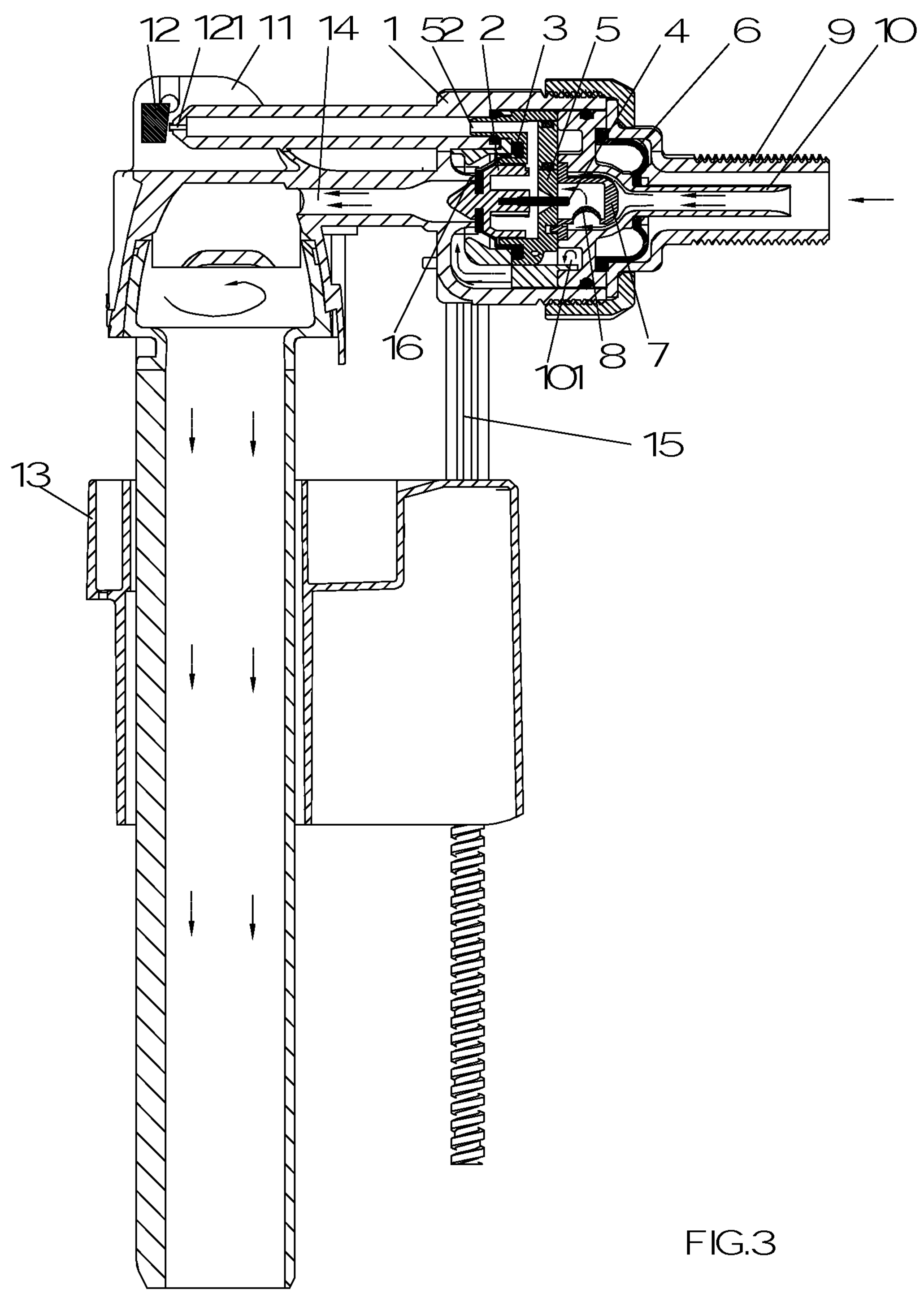
FIG. 3 shows the partial sectional view of FIG. 1 along A-A.

As shown in FIGS. 1, 2 and 3, the embodiment of the present invention is shown, 1 is the valve body, the main components of the water stop device is composed of the tray 2, the water stop rubber gasket 3, needle valve 4 and needle valve cover 5, wherein the needle valve cover 5 is also provided with a discharge hole 52; 6 is elastic air bag, 7 is filter, 8 is filter screen; 9 is screw head, 10 is inlet pipe; 11 is raising rod, 12 is upper rubber gasket, 121 is discharge opening, 13 is float bowl, 14 is outlet pipe, 15 is adjusting rod, 16 is water stop seat; the direction of water flow is shown by the arrow in the figures.

Figure 4:
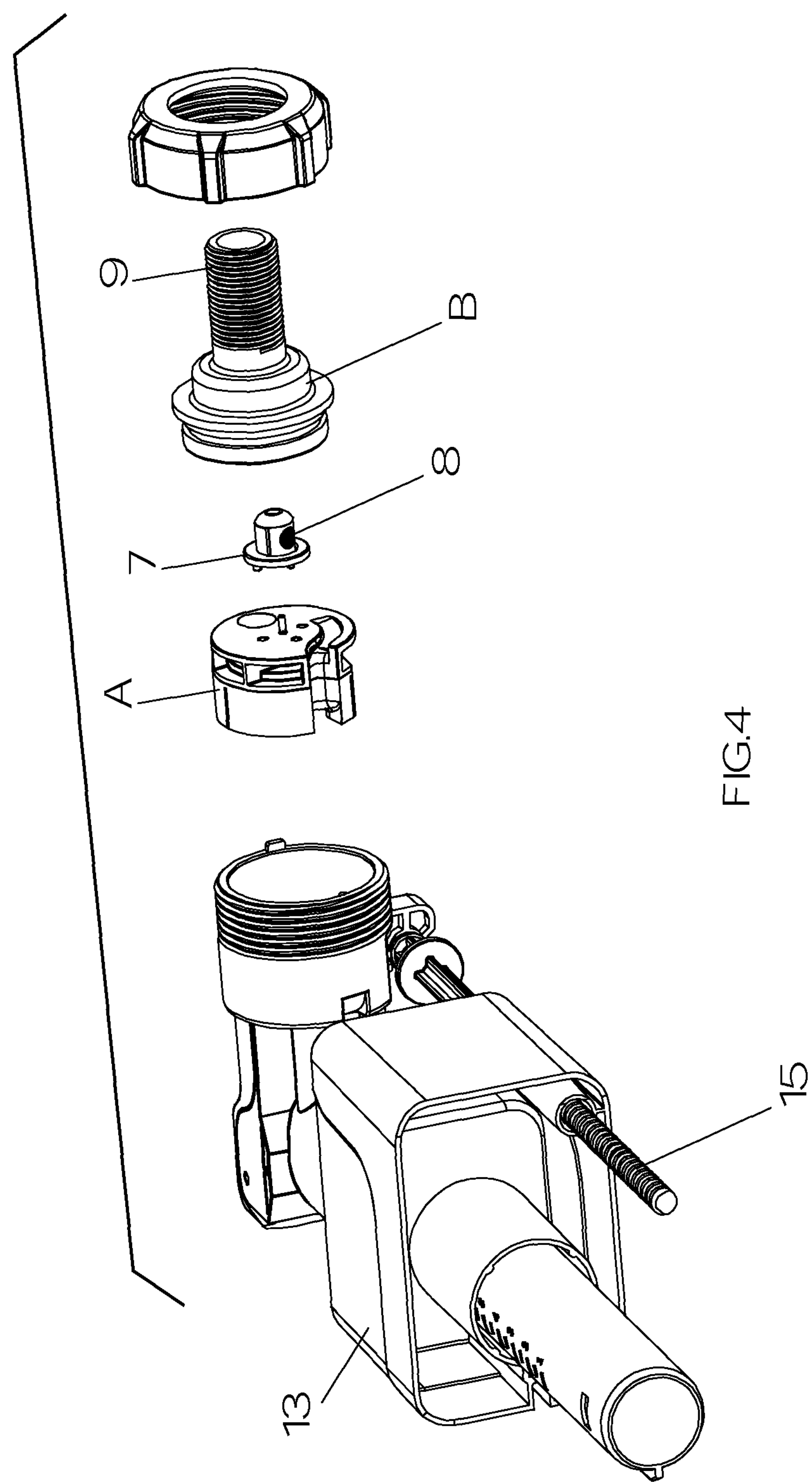
FIG. 4 shows an exploded view of the present invention.
Figure 5:
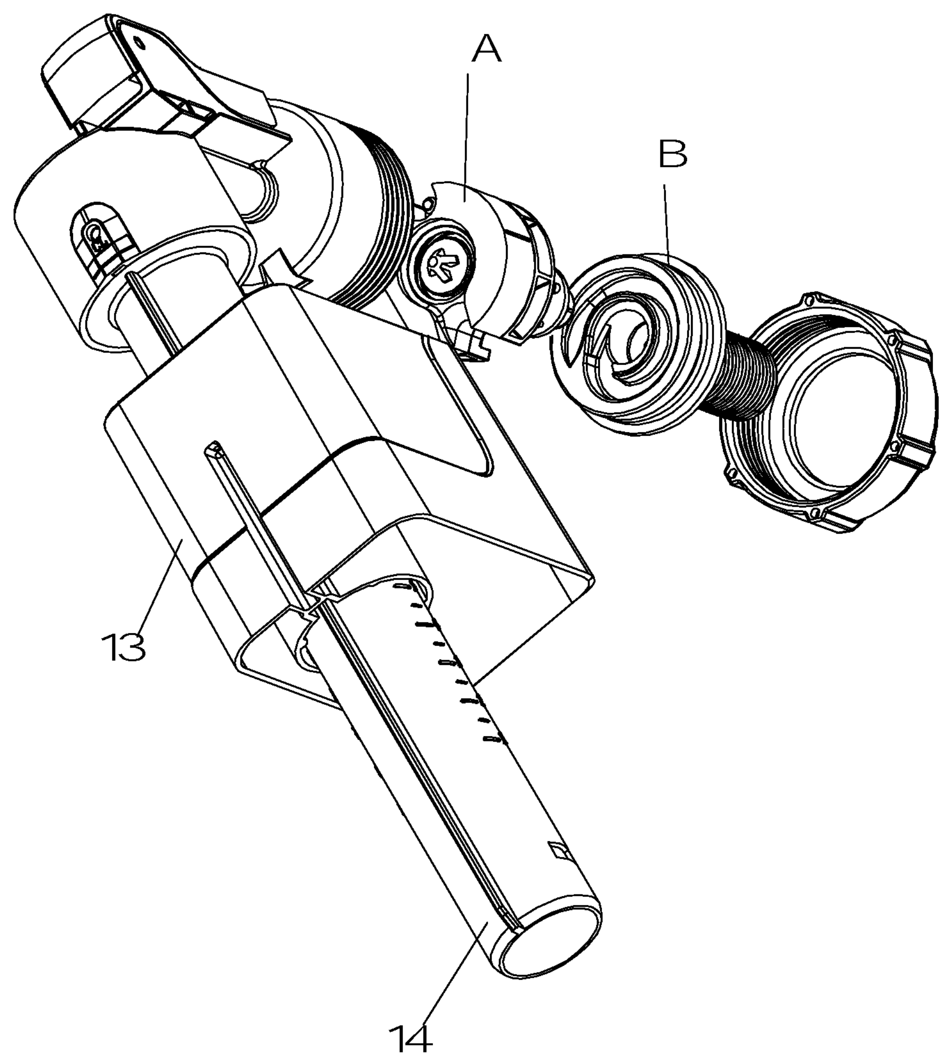
FIG. 5 shows the exploded view of the present invention from another view.
Figure 6:
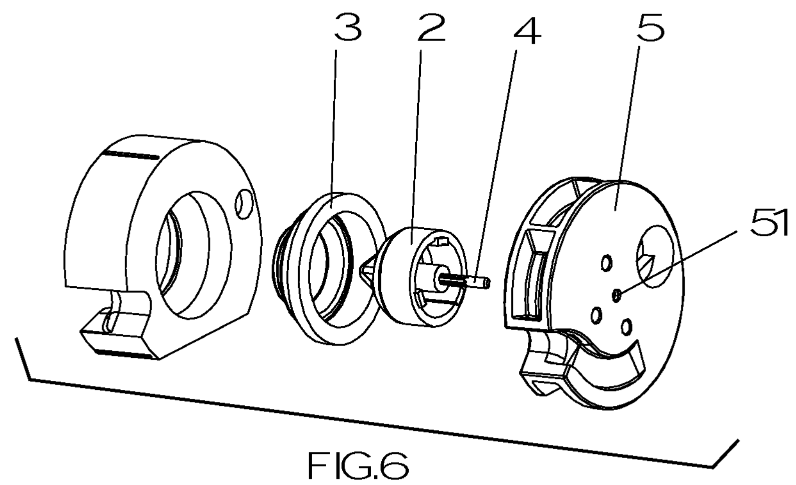
FIG. 6 shows the partial sectional view of A part of FIGS. 4 and 5.
Figure 7:
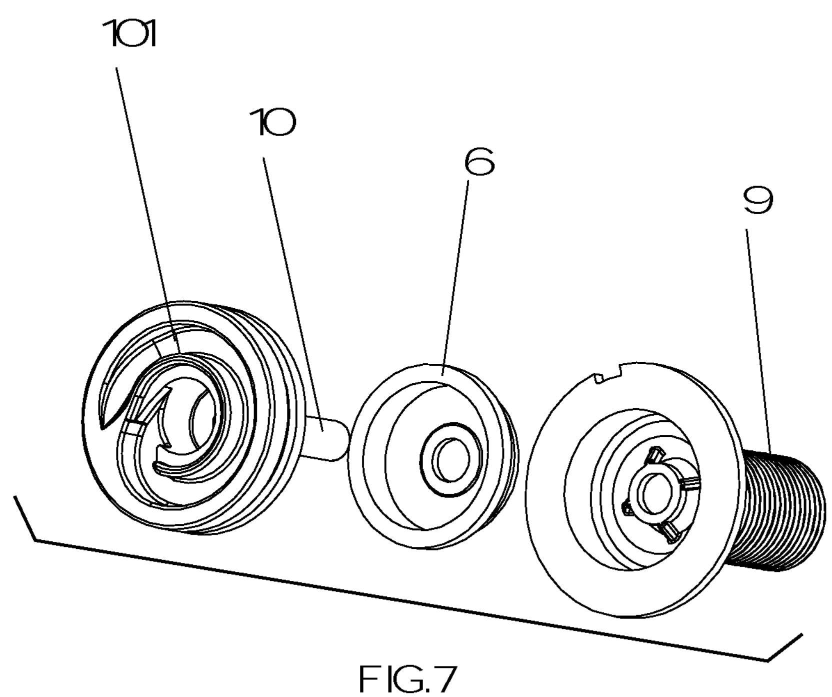
FIG. 7 shows the partial sectional view of B part of FIGS. 4 and 5.
Figure 8:
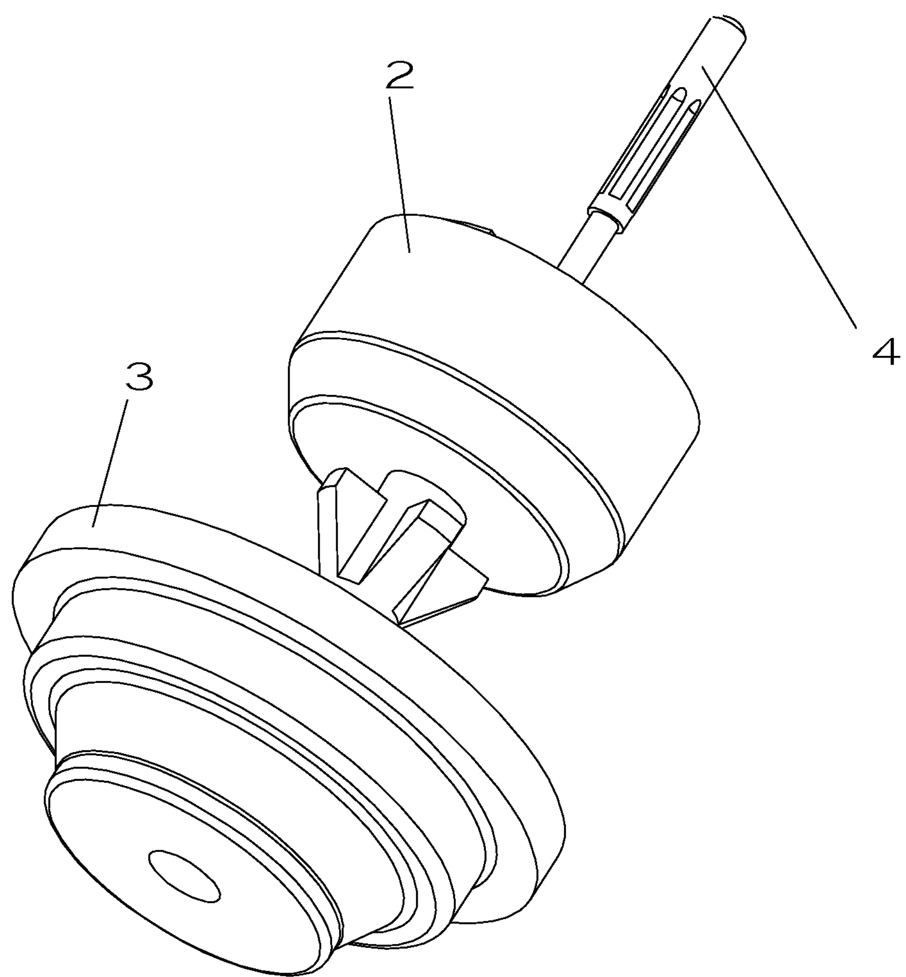
FIG. 8 shows the partial sectional view of the main component of A part of FIGS. 4 and 5 from another view.

The internal structure of the valve body 1 is more clearly shown in a solid exploded way in FIGS. 4, 5, 6, 7 and 8. In FIGS. 4 and 5, the module A comprises the main components of the water stop device, the module B comprises the main components of the inlet pipe part. Wherein, the exploded view of FIG. 4 is shown in FIG. 6, the main body part of the back pressure cavity is the needle valve cover, the tray 2 is sleeved to one end of the gap segment of the needle valve 4 in a fixing manner, the front end of the tray 2 passes through and is fixed to the top end of the water stop rubber gasket 3; and the coupling segment of the needle valve 4 is inserted into the needle valve hole 51 of the needle valve cover 5, although the shapes are agreed with each other, free sliding and non-liquid seal can be achieved. The relationship of the water stop rubber gasket 3, the tray 2 and the needle valve 4 in module A is shown from another view in FIG. 8; the exploded view of the module B is shown in FIG. 7, the elastic air bag 6 is sleeved to the bottom of the inlet pipe 10, and then the screw head 9 is sleeved to the inlet pipe; the bottom of the inlet pipe 10 is provided with a rotary fluid cavity 101.

Figure 9:
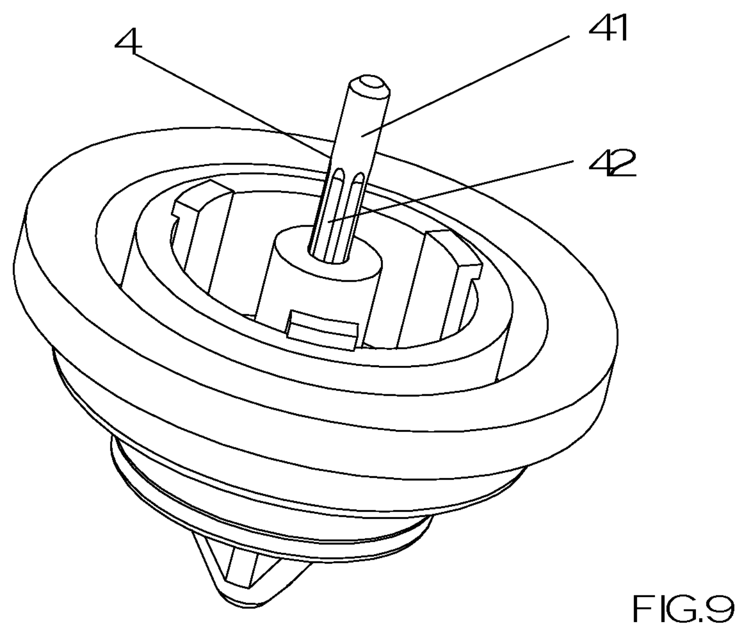
FIG. 9 shows the proposal view that the needle valve with groove-type gap segment is present, corresponding to the tray.
Figure 10:
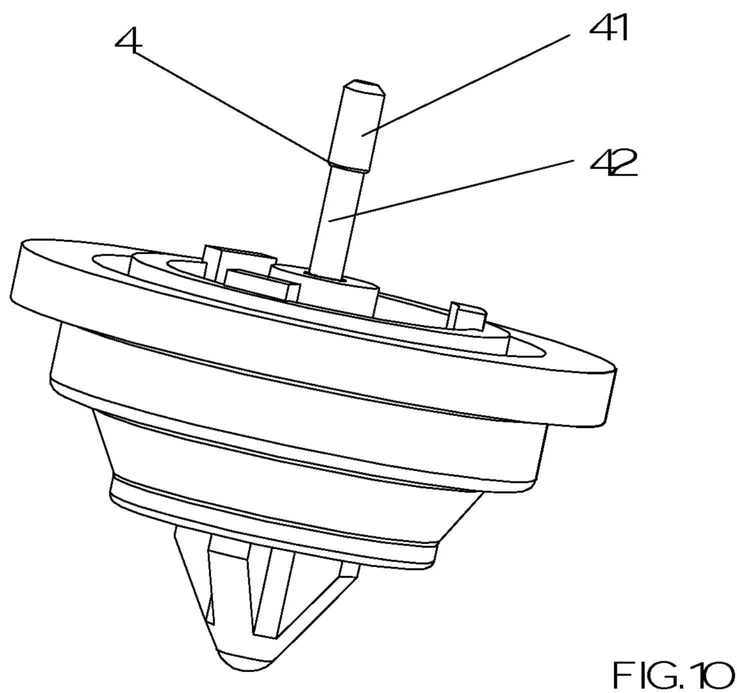
FIG. 10 shows the proposal view that the needle valve with footstep-type gap segment is present, corresponding to the tray.

FIGS. 9 and 10 show two kinds of needle valves mounted in the tray 2, the cross section of the coupling segment 41 of the needle valve 4 in FIG. 9 is circular, and the gap segment 42 comprises slots arranged along the circumferential direction; the cross section of the coupling segment 41 of the needle valve 4 in FIG. 10 is also circular, and the cross section of the gap segment is circular with shorter diameter than that of the coupling segment 41.

The working states are stated according to the flowing sequence of water. As shown in FIG. 3, the water flow from the water system enters the screw head 9 first, and then is divided into two ways at this position, one of which reaches the air bag cavity from outside of the inlet pipe 10 and then stops or returns after touching the air bag, another of which enters the valve body 1 through the inlet pipe 10, where it is divided into two ways, one of which is dry way, another of which is the control branch.

The dry way: water in this way enters the fluid cavity 101 of the inlet pipe at the inlet pipe 10, and then reaches the water stop rubber gasket 3 in a rotating way, and a reverse water pressure to the water stop rubber gasket 3 is generated, of which the direction is totally opposite to the water flow in the inlet pipe 10;

The control branch: water in this way enters the internal cavity of the filter 7 through the filter screen 8, and then passes through the gap between the needle valve 4 and the needle valve hole 51 (shown in FIG. 6, and then reaches the back pressure cavity of the needle valve cover 5, and then a downstream water pressure is given to the tray 2, of which the direction is agree with the water flow direction in the inlet pipe 10.

If the float bowl 13 is raised by the water level in the whole water tank and reaches the closing position at this time, the float howl controls the upper rubber gasket 12 to block the corresponding discharge opening 121 through the adjusting rod 15, so that the downstream water pressure in the back pressure cavity where the needle valve cover 5 locates shares the same intensity of pressure with the reverse water pressure in the dry way, because there is difference that is designed between the active areas of the water pressure of the two sides of the water stop rubber gasket 2, the downstream water pressure is bigger than the reverse water pressure at this time, and then the water stop rubber gasket 3 is oppressed by the tray 2 from the outlet direction, and the water stop seat 16 is blocked by the water stop rubber gasket 3, and then water flow is stopped from the dry way to the outlet pipe;

If the water level in the whole water tank drops at this time, the float bowl 13 is dropped, and the discharge opening 121 is not blocked by the upper rubber gasket 12, and then the downstream water pressure in the back pressure cavity where the needle valve cover 5 is reduced quickly, and no change occurs at the reverse water pressure in the dry way, therefore the water stop rubber gasket 3 and the tray 2 both fall back under the action of the reverse water pressure, and then the water stop seat 16 is opened, and then the water flow in the dry way flows down smoothly along the pipe wall of the outlet pipe 14 in a rotating manner.

Since then after the float bowl 13 drops, water will comes out of the outlet pipe to raise the water level of the water tank until the closing position is reached. At this time, the discharge opening 121 is blocked again by the upper rubber gasket 12, and the downstream water pressure in the back pressure cavity where the needle valve cover 5 locates starts to return: during this process, the dry way water flow from the inlet pipe 10 passes through the gap between the needle valve 4 and the needle valve hole 51 and then oppresses the tray 2 to move toward the outlet direction and squeezes the water stop rubber gasket gradually; during the above process, the gap segment is first present between the needle valve 4 and the needle valve hole 51 with big water flow rate: when the tray 2 keeps moving, the needle valve 4 is driven to move in the needle valve hole 51, and the coupling segment of the needle valve 4 will enter the needle valve hole 51 gradually and replace the gap segment, and then the water flow rate is decreased, the trend of increasing of the downstream water pressure is remitted, and the tray 2 compresses the water stop rubber gasket 3 slowly until the outlet seat 16 is blocked by the water stop rubber gasket 3, the multiple step water stop manner is determined by the two-segment-type structure of the needle valve 4, and the shake and noise in the valve body during the water stop process is decreased.

Embodiment 2

Figure 11:
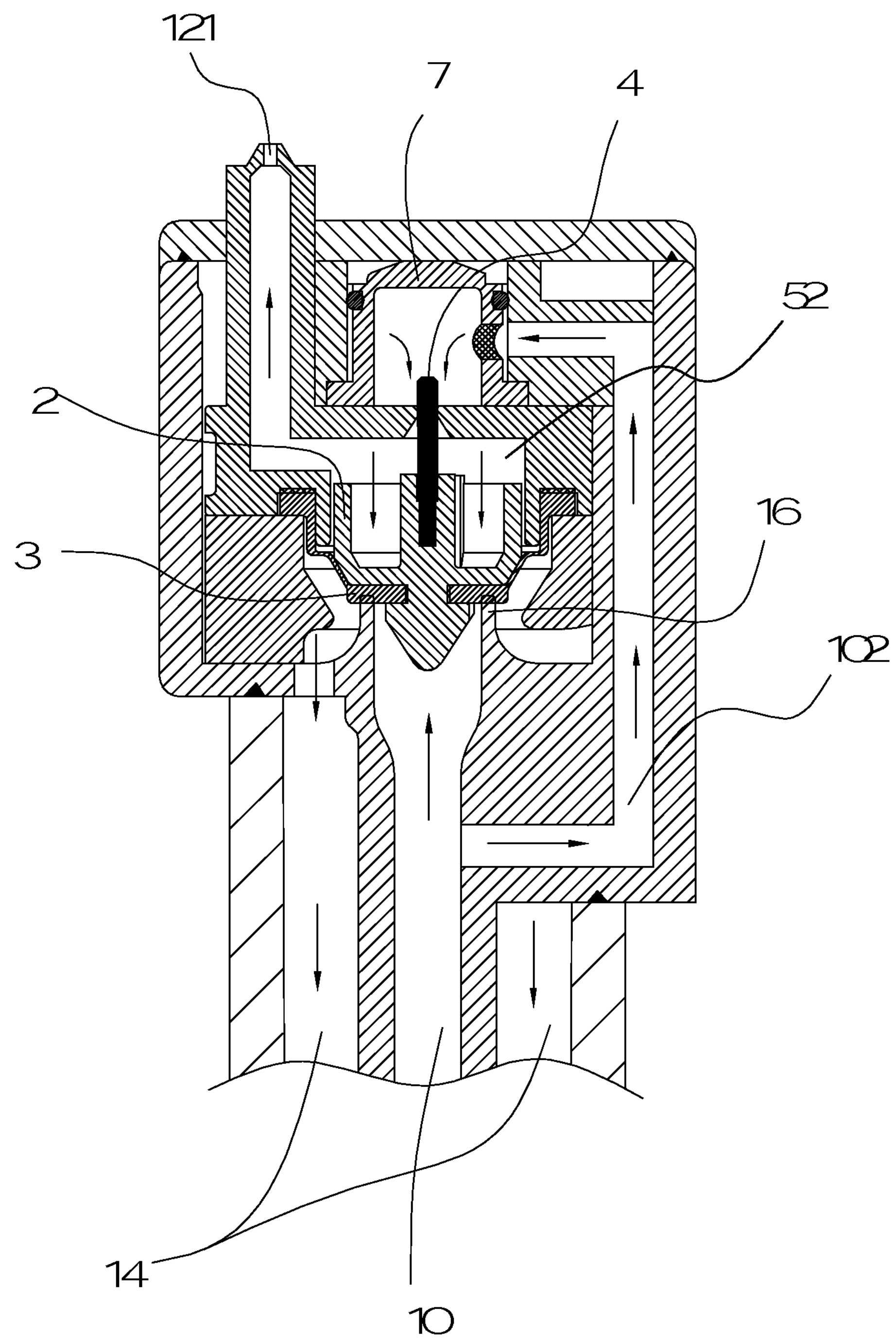
FIG. 11 shows the sectional view of the embodiment 2 in the present invention.

Another preferred embodiment in the present invention is shown in FIG. 11. Compared with the embodiment 1, the same points are: the water stop device comprises the tray 2, the water stop rubber gasket, and the relative position and function of the needle valve 4 and the back pressure cavity 51; the different points are: the relative direction of the whole water stop device and the inlet and outlet pipes are opposite to that of the embodiment 1, because the end of the inlet pipe 10 is the water stop seat 16, the water stop seat 16 approaches the water stop rubber gasket 3 and can be block by the water stop rubber gasket 3, and the outlet pipe 14 is connected to the outside cavity of the water stop seat 16.

Dry way: water in this way enters the fluid cavity of the inlet pipe at the inlet pipe 10, and a reverse water pressure to the water stop rubber gasket 3 is generated, the direction of which is identical to the water flow direction in the inlet pipe 10;

Water in the control branch enters the filter 7 through the passageway 102, and then enters the back pressure cavity 52 through the needle valve 4; when the water stop rubber gasket 53 is oppressed by the tray 2 to block the water stop seat 16 downwards, the water in the inlet pipe 10 is shut; when the discharge opening 121 is opened to release the water pressure in the back pressure cavity 52, the water stop rubber gasket 3 is opposed by the water pressure of the inlet pipe 10 to raise the tray 2, and then the water stop seat 16 is opened, so that the outlet pipe 14 is communicated with the inlet pipe 10, water flows out (with the opposite direction as the inlet direction of the inlet pipe), and the needle valve 4 still moves with the tray 2 synchronously.

The invention has been described with reference to the preferred embodiments mentioned above: therefore it cannot limit the reference implementation of the invention. It is obvious to a person skilled in the art that structural modification and changes can be carried out without leaving the scope of the claims hereinafter and the description above.

INDUSTRIAL APPLICABILITY

The valve body in the present invention divided water flow into two ways; one way is the dry way, another way is the control branch; water in the dry way reaches the water stop rubber gasket, and a reverse water pressure to the water stop rubber gasket is generated; water in the control branch passes through the gap between the needle valve and the needle valve hole, and reaches the back pressure cavity comprising the need valve cover, and a downstream water pressure is given to the tray. The gap between the needle valve and the needle valve hole is stable, so that the noise and shake during the working process is decreased. Because the two-segment-type structure of the needle valve, the needle valve is provided with a damping off process in the working cycle, and then the shock and shake caused by water stop is greatly remitted, and the gouging abrasion and the working noise among the components are deceased.

What is claimed is:

1. A toilet inlet valve, comprising a valve body, an inlet pipe, a water stop device with a water stop rubber gasket, a float bowl device, a raising rod device and an outlet pipe, wherein, the water stop device also comprises:

a water stop seat, which is located at a front end of the outlet pipe, and of which an opening is coupling with an end face of the water stop rubber gasket;

a tray, which is connected to the water stop rubber gasket, and is located at a side of the water stop rubber gasket that is opposite to the water stop seat;

a needle valve, which is fixed to the tray, and is located at a side of the tray that is opposite to the water stop rubber gasket;

a back pressure cavity, which is a cavity with a discharge hole, containing the tray and the needle valve, and is provided with a needle valve hole sleeved around the needle valve;

water is divided into two ways by an inlet pipe valve body, one way is a dry way, and another way is a control branch;

the dry way: water in this way enters a fluid cavity of the inlet pipe, and reaches the water stop rubber gasket, and then a reverse water pressure is generated, in an opposite direction to a water flow direction in the inlet pipe;

the control branch: water in this way passes through a gap between the needle valve and the needle valve hole, and then reaches the back pressure cavity containing a needle valve cover, and then a downstream water pressure to the tray is generated, in a same direction as the water flow direction in the inlet pipe.

2. A toilet inlet valve according to claim 1, wherein, the shape of the tray is bowl-shaped, of which the outer surface is a cylindrical surface.

3. A toilet inlet valve according to claim 1, wherein, a filter with a filter screen is provided out of the needle valve hole.

4. A toilet inlet valve according to claim 3, wherein, an inlet of the filter screen of the filter is downstream of the water flow from the inlet pipe and the filter is aligned with the water flow direction from the inlet pipe.

5. A toilet inlet valve according to claim 1, wherein, a coaxial air bag cavity is provided outside of the inlet pipe, and the bottom of the air bag cavity comprises a circular elastic air bag.

6. A toilet inlet valve according to claim 5, wherein, the fluid cavity on the bottom of the inlet pipe is provided with a rotary structure.

7. A toilet inlet valve according to claim 1, wherein, the needle valve is divided into two segments along its axial direction, which are:

a coupling segment, of which the cross section is coupling with the needle valve hole;

a gap segment, of which the cross section is not coupling with the needle valve hole but provided with clear gap.

8. A toilet inlet valve according to claim 7, wherein, the cross section of the coupling segment of the needle valve is circular, and the outer surface of the gap segment is provided with a plurality of slots along the axial direction of the needle valve, which extend to the tray.

9. A toilet inlet valve according to claim 8, wherein, the cross section of the coupling segment of the needle valve is circular, and that of the gap segment is also circular, and the diameter of the cross section of the gap segment is shorter than the diameter of the cross section of the coupling segment.

10. A toilet inlet valve comprising a valve body, an inlet pipe, a water stop device, wherein, the water stop device also comprises:

a water stop seat, which is located at a front end of an outlet pipe, and of which an opening is coupling with an end face of the water stop rubber gasket;

a tray, which is connected to the water stop rubber gasket, and is located at a side of the water stop rubber gasket that is opposite to the water stop seat;

a needle valve, which is fixed to the tray, and is located at a side of the tray that is opposite to the water stop rubber gasket;

a back pressure cavity, which is a cavity with a discharge hole, containing the tray and the needle valve, and is provided with a needle valve hole sleeved around the needle valve;

wherein water is divided into two ways by an inlet pipe valve body, one way is a dry way, and another way is a control branch;

wherein in the dry way, water enters a fluid cavity of the inlet pipe, reaches the water stop rubber gasket, and then a reverse water pressure is generated, which is in an opposite direction to a water flow direction in the inlet pipe;

wherein in the control branch, water passes through the gap between the needle valve and a needle valve hole, and then reaches the back pressure cavity containing a needle valve cover, and then a downstream water pressure to the tray is generated, in a same direction as the water flow direction in the inlet pipe;

wherein when the discharge opening is blocked, water flows into the back pressure cavity through the inlet of the back pressure cavity, the control branch that is formed by the gap between the needle valve and the needle valve hole, the downstream water pressure to the water stop rubber gasket in the back pressure cavity is bigger than the reverse water pressure, and the water stop seat is blocked by the water stop rubber gasket;

wherein when the discharge opening is opened, the stored water in the back pressure cavity flows out of the discharge opening, and the downstream water pressure is decreased;

wherein when the intensity of water pressure to the water stop rubber gasket in the back pressure cavity is smaller than the reverse (outside) intensity of pressure, then the water stop rubber gasket is opened.

11. A toilet inlet valve according to claim 10, wherein, the needle valve is divided into two segments along its axial direction, which are:

a coupling segment, of which the cross section is coupling with the needle valve hole;

a gap segment, of which the cross section is not coupling with the needle valve hole but provided with clear gap;

when the discharge opening is blocked, water from the inlet pipe flows into the back pressure cavity through the gap between the needle valve hole and the needle valve, the water in the back pressure cavity starts to increase; and wherein during the water increasing process, the needle valve is driven to move reversely with respective to a first dynamic state, and the gap segment and the coupling segment of the needle valve are present in the needle valve hole successively, so that the inlet rate in the back pressure cavity is decreased, and then the pressure increasing rate in the back pressure cavity is decreased.

* * * * *